United States Patent [19]

Schultz

[11] 3,718,634

[45] Feb. 27, 1973

[54] POLYMERIZATION OF ALKYL VINYL ETHERS WITH CATALYST BASED ON DIALKYL ALUMINUM HALIDE AND WATER

[75] Inventor: Herman S. Schultz, Easton, Pa.
[73] Assignee: GAF Corporation
[22] Filed: May 17, 1967
[21] Appl. No.: 639,015

[52] U.S. Cl..........260/91.1 M, 117/161, 260/80.3 E, 260/91.1 A
[51] Int. Cl. ...............................................C08f 3/38
[58] Field of Search....... 260/91.1, 91.1 M, 91.1 A, 80.3 E

[56] References Cited

OTHER PUBLICATIONS

Seagusa et al., Chem. Abs., 62 (1965) p. 4127a.
Furukawa et al., Chem. Abs. 64 (1966) p. 12840f.
Furukawa et al., Chem. Abs., 64 (1966) p. 12840h to p. 12841a.

Primary Examiner—Harry Wong, Jr.
Attorney—Steven J. Baron, Walter C. Kehm and Samson B. Leavitt

[57] ABSTRACT

High molecular weight amorphous, or only slightly crystalline, polymers of improved characteristics are obtained by polymerization of alkyl vinyl ethers using an improved catalyst system comprising the reaction product of a dialkyl aluminum halide and co-catalytic amount of water.

11 Claims, No Drawings

POLYMERIZATION OF ALKYL VINYL ETHERS WITH CATALYST BASED ON DIALKYL ALUMINUM HALIDE AND WATER

FIELD OF THE INVENTION

This invention relates to a new and useful process for polymerizing vinyl ethers. More particularly, this invention relates to a process for polymerizing alkyl vinyl ethers or mixtures thereof to polymers with a catalyst consisting of the reaction product of organo aluminum halides with a co-catalytic amount of water.

It is an object of this invention to provide a process for producing high yields of clear, high molecular weight, colorless, amorphous or only slightly crystalline structurally homogenous polymers of alkyl vinyl ethers which are particularly suitable for use in the pressure sensitive adhesives, coatings, and as processing aids and tackifiers in the plastic and rubber trades. It is another object of this invention to provide a new catalyst system for polymerizing alkyl vinyl ethers to polymers which have the above characteristics at industrially practical temperature ranges. It is a further object of this invention to provide a process for polymerizing alkyl vinyl ethers with a catalyst system based on an organo aluminum halide and water. Other objects and advantages of this invention will become readily apparent hereinafter as the description proceeds.

I have now discovered that the above objects may be readily obtained by utilizing a process for polymerizing alkyl vinyl ethers with a catalyst based on an organo aluminum halide in the presence of a co-catalytic amount of water.

Thus, the instant invention may be more specifically defined as a process for preparing amorphous or very slightly crystalline polymers from alkyl vinyl ethers which comprises polymerizing an alkyl vinyl ether, wherein the alkyl radical contains from one to 20 carbon atoms with a dialkyl aluminum halide catalyst and a co-catalytic amount of water.

DESCRIPTION OF PREFERRED EMBODIMENTS

The alkyl vinyl ethers which are herein contemplated for use in the instant invention are those wherein the alkyl radical contains from 1 to 20 carbon atoms, preferably from one to 12 carbon atoms. Said ethers may be depicted by the general formula R—O—CH=CH$_2$, wherein R represents the alkyl radical. Specific examples of such ethers include, for instance:

methyl vinyl ether
ethyl vinyl ether
n-propyl vinyl ether
isopropyl vinyl ether
n-butyl vinyl ether
isobutyl vinyl ether
t-butyl vinyl ether
neopentyl vinyl ether
hexyl vinyl ether
ethyl hexyl vinyl ether
octyl vinyl ether
isooctyl vinyl ether
decyl vinyl ether
cetyl vinyl ether
dodecyl vinyl ether
tridecyl vinyl ether
hexadecyl vinyl ether
stearyl vinyl ether
octadecyl vinyl ether
2-chloroethyl vinyl ether
trifluoroethyl vinyl ether
eicosyl vinyl ether
and the like, or mixtures thereof.

The polymerization catalysts employed by the present invention are reaction products of the class of compounds known as dialkyl aluminum halides with water. The dialkyl aluminum halides may be represented by the formula

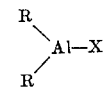

wherein R represents the same or different alkyl radical containing from one to 20 carbon atoms and wherein X represents a halogen atom, such as chlorine, fluorine, bromine or iodine, preferably chlorine. Moreover, mixtures of two or more of these catalysts may be used, if desired. Examples of specific catalysts which may be mentioned include for instance:

dimethyl aluminum bromide
dimethyl aluminum chloride
diethyl aluminum chloride
diethyl aluminum bromide
diethyl aluminum fluoride
dipropyl aluminum chloride
dibutyl aluminum chloride
diisobutyl aluminum chloride
ethylisobutyl aluminum chloride
dipropyl aluminum fluoride
diethyl aluminum iodide
dihexyl aluminum chloride
dioctyl aluminum chloride
ethylpropyl aluminum bromide,
and the like.

In general, the homo or copolymerization process involves adding a catalytic amount of the dialkyl aluminum halide catalyst component followed by a co-catalytic amount of water to one or more substantially anhydrous alkyl vinyl ether monomers in solvent solution. However, the order of addition is not critical, for example, the water may be added directly to the anhydrous polymerization solution or through the introduction of controlled amounts of wet solvent or monomer. A controlled partial drying of the wet solvent employing molecular sieves to remove some but not all of its water, is an alternative procedure that may be used, if desired. In addition, the reverse process of adding the alkyl vinyl ether monomer to this hydrocarbon solution of the catalyst, prepared from the dialkyl aluminum halide and water in situ, may also be followed. The catalyst may be added in total or batchwise during the course of the polymerization. An especially useful embodiment is the addition of the prereacted product from the dialkyl aluminum halide component and water, generally in a diluent, as the catalyst. For the preparation of the prereacted catalyst, it is preferable for convenience of handling and catalyst uniformity to add a dilute solution of water in a carrier such as 1,4-dioxane and/or a hydrocarbon to a dilute solution of the dialkyl aluminum halide in a hydrocarbon beginning under cold temperature conditions, i.e., 0°C and lower. From the standpoint of the most optimum results, the preferred catalyst system is one in which the catalyst concentration based on the amount of dialkyl aluminum halide ranges from about 0.02 to about 2.0 mole-%, most preferably from about 0.03 to about 0.5 mole-% relative to the weight of the alkyl vinyl ether monomer.

The polymerization process may be carried out at temperatures ranging from about −30° to 60°C, while temperatures of about −10°C to about room temperature are preferred for alkyl vinyl ethers having an alkyl radical of two or more carbon atoms and temperatures of about −30° to about +10°C are preferred for methyl vinyl ether.

The use of proper co-catalytic amount of water is critical to the instant invention if the optimum polymerization results are to be realized. For example, for methyl vinyl ether and higher alkyl monomers, little if any product is obtained in the absence of water, while negligible polymerization occurs in the presence of too much water. The amount of water required as a cocatalyst may be represented by a catalyst/water molar ratio which may range from about 1/1 to 30/1, and is preferably maintained from about 3/1 to 15/1.

As pointed out above, one of the preferred conditions is to employ an inert non-reactive solvent as a carrier for the alkyl vinyl ether monomer (so that the reaction system, i.e., solution is a liquid at the beginning of the polymerization reaction) in order to obtain the greatest degree of conversion and polymer of the best and optimum properties. The presence of the solvent or diluent acts as a moderating influence during the polymerization and prevents undesirable side reactions and heterogeneity of the product which could result due, among other factors, to the exothermic nature of the polymerization. The use of such inert solvents or diluents in the polymerization of alkyl vinyl ethers is well known, but in the present reaction it is preferred to employ an aliphatic hydrocarbon solvent, such as pentane, hexane, heptane, octane and the like, especially hexane or heptane. However, other inert solvents, for example, cyclohexane, aromatic hydrocarbons, i.e., benzene, toluene, xylene and the like or hydrogenated hydrocarbons such as chloroform or methylene chloride and ethers such as diethyl ether, dipropyl, dioxane, and the like, may also be used, if desired. It should be understood, of course, that an admixture of two or more of the above mentioned solvents may also be employed. The concentration of the alkyl vinyl ether monomer in the inert solvent is generally maintained at the 15 to 50 percent level. Moreover, in order to obtain the most optimum results, it is preferred to utilize these solvents in a highly purified substantially anhydrous form.

The instant process affords high conversion of monomer to polymer, for instance, conversion values are often over 90 percent. In general, the amorphous or only slightly crystalline homopolymer products may be characterized by their physical properties of being colorless, tacky, tough and rubbery and of high molecular weight values.

The viscosity number of a polymer is related to its molecular weight according to the Mark-Houwink equation (see Makromoleculare Chemie, Vol. 37, pages 187–197, 1960):

$$[\eta] \; 7.6 \times 10^{-4} M^{0.60}$$

wherein $[\eta]$ = intrinsic viscosity and $M$ = molecular weight by measurements in benzene. The viscosity number at 0.1 percent concentration is very close to the intrinsic viscosity. Thus, $$\text{visc. no.} = (\eta_{rel} - 1)/C$$

wherein $C$ = grams of polymer per 100 cc. solution, $\eta_{rel}$ = relative viscosity and $[\eta]$ = visc. no. $_{\lim C \; 0}$.

A particular important and valuable aspect of the instant invention is the good control one has over the polymerization process.

Recovery of the final product is easily accomplished by conventional procedures. For example, the process may be easily quenched with an excess of a lower alcohol or methanolic ammonia or amines and the quenched catalyst residues removed by procedures including washing with water and/or methanol. The polymer may then be recovered by any conventional method.

The following examples are illustrative of the present invention and are not to be regarded as limitative. It is to be understood that all parts, percentages and proportions referred to herein and in the appended claims are by weight unless otherwise indicated.

EXAMPLE I

Eighty grams of heptane previously washed with concentrated sulfuric acid and refluxed over sodium were distilled from LiAlH$_4$ into a clean, dry polymerization vessel under nitrogen. Then 20 g. of isobutyl vinyl ether, whose purification involved water washing, refluxing over sodium metal and several careful fractional distillations, were distilled from LiAlH$_4$ into the reaction vessel under dry nitrogen. 0.02 g. (0.1 wt. % based on the monomer) of diethyl aluminum chloride in heptane was introduced at room temperature. Very little polymerization occurred over a 2 hour period. The solution was very slightly viscous and no exotherm was given off. Heptane containing $1.96 \times 10^{-5}$ moles of water was added and a rapid exothermic polymerization ensued. The mole ratio of catalyst to water was about 8/1. 1. A very viscous solution formed. Three hours later the polymerization was quenched with 1 cc of methanol, diluted with heptane and water washed. The heptane was stripped off under reduced pressure and the polymer was dried at 50°–60°C under 5 mm pressure for 7 hours. 20 g. (about 100 percent conversion) of the homopolymer product was obtained. The product was a colorless, tacky elastomic material which exhibited a viscosity number at 0.1 percent in toluene of 4.07 and was shown to be amorphous by X-ray diffraction examination.

Similar results may be obtained by replacing isobutyl vinyl ether with other alkyl vinyl ethers such as ethyl vinyl ether, propyl vinyl ether, butyl vinyl ether, hexyl vinyl ether, isooctyl vinyl ether, dodecyl vinyl ether, hexadecyl vinyl ether, octadecyl vinyl ether, eicosyl vinyl ether and the like, or by replacing diethyl aluminum chloride with other catalysts such as dimethyl aluminum chloride, diethyl aluminum bromide, diethyl aluminum fluoride, dibutyl aluminum chloride, diisobutyl aluminum chloride, diethyl aluminum iodide, dioctyl aluminum chloride, ethylpropyl aluminum bromide, and the like.

EXAMPLE II

A polymerization vessel with a dry nitrogen atmosphere and a mechanical stirrer was charged with 80 g. of purified heptane containing 10 ppm water and 20 g. of purified isobutyl vinyl ether distilled from sodium sand. The catalyst to water mole ratio was about 4/1. 1. At 15°C, 0.02 g. (0.1 wt. % based on the monomer) of diethyl aluminum chloride in heptane was added. A polymerization ensued with the formation of a very viscous solution in which a maximum temperature of 28°C was attained. After 1 hour, the reaction was quenched with 1.2 cc of methanol, diluted with heptane. Recovery of the product by solvent stripping and vacuum drying yielded 19.3 g. (about 96.5 percent conversion) of a colorless, tacky, rubbery polymer. This product exhibited a viscosity number at 0.1 percent in toluene of 4.74 and was shown to be amorphous by X-ray diffraction examination.

EXAMPLE III

A polymerization vessel with a nitrogen atmosphere and a mechanical stirrer was charged with 165 cc. of AMSCO commercial heptane previously dried by passing over a column of molecular sieves to about 60 ppm of water and 20 g. of purified, freshly distilled isobutyl vinyl ether. The catalyst to water mole ratio was about 2/1. 1. This solution was cooled to $-1°C$ and 0.1 wt. % based on the monomer of diethyl aluminum chloride in heptane was added. A slow slightly exothermic polymerization ensued with a maximum temperature of 4°C being attained after 5 minutes. A very viscous solution was formed, the reaction was continued with like portions of the catalyst being added after the first and third hours. After 4 hours the polymerization was quenched with 2 cc. methanol, diluted with heptane, washed with water and methanol. Solvent stripping and vacuum drying yielded 19.5 g. (about 97.5 percent conversion) of a colorless, tacky, rubbery homopolymer.

Said homopolymer had a viscosity number at 0.1 percent in toluene of 3.76 and was shown to be amorphous by X-ray examination.

EXAMPLE IV

The polymerization procedure for the following experiments 1 through 5 were carried out as a set at the same time under the same conditions. The polymerizations were carried out in carefully cleaned bottles equipped with a perforated crown cap and a self sealing cap liner. The bottles which were used had first been alternately evacuated and filled with nitrogen on a vacuum manifold several times with intermittent warming with a hot air gun. The bottle reactors were capped in a dry nitrogen filled dry box (or glove box). Hypodermic syringe assemblies and other necessary equipment used during the reaction manipulation were handled similarly. Into the aforementioned nitrogen filled and capped reactor bottles there was introduced by way of a hypodermic needle, methyl vinyl ether which had previously been purified and dried over sodium. The technique for transferring the monomer to the reaction bottle involves vaporizing the monomer from the storage vessel thereof through a closed, initially evacuated system and condensing the reactor at a lower temperature (0° to $-10°C$) through the aforementioned hypodermic needle which has been previously injected into the reaction vessels. Purified and dried toluene was then injected by way of a hypodermic needle. The latter was purified and dried over sodium ribbon and was taken from bottles which were capped similarly as the reactor bottles in a dry box and then pressured with dry nitrogen immediately prior to withdrawal into a hypodermic syringe. The ratio of methyl vinyl ether to toluene employed in all the reaction was 1 gm/1 cc. Various calculated amounts of nitrogen blown water were injected into the reaction solution at $-10°C$ using a micro syringe. The catalyst bottle and the reactor were all equipped with a device which makes it possible to keep a flowing nitrogen atmosphere over the crown caps and still inject or remove reagent to or from a bottle with a hypodermic syringe in a clean essentially moisture and air free fashion. 0.50 mole-% diethyl aluminum chloride based on the monomer was added to each reactor at 0°C with immediate hand shaking of the reaction bottles. The reactions reacted for 22 hours at 0°C after which they were concluded by quenching with methanolic ammonia and the products were recovered. The results of these experiments are recorded in the following table:

TABLE I

| Run No. | Catalyst/$H_2O$ Ratio | Yield | Visc. No. 0.1% benzene | Qualitative Comments on Rate and Viscosity of Reaction Solution |
|---|---|---|---|---|
| 1 | no water added | 21% | 1.26 | only slightly viscous in 5 hours |
| 2 | 5/1 | 100% | 0.67 | viscous within 15 min. |
| 3 | 2/1 | 99% | 0.26 | viscous in 15 min. |
| 4 | 1/1 | 88.4% | 0.17 | viscous in 15 min. |
| 5 | 1/2 | 2–3% | — | no viscosity after 22 hours |

The results aptly demonstrate that in the absence of water, or in the presence of too much water, low yields are obtained, while co-catalytic amounts of water in the proper range yield over 95 percent of an amorphous homopolymer.

EXAMPLE V

This example was carried out at the same time and by exactly the same procedure at 0°C as Example IV, except that the diethyl aluminum chloride/water mole ratio is 5/1 and the mole-% diethyl aluminum chloride relative to methyl vinyl ether is 0.070. The yield after 22 hours was 50.6 percent and the viscosity number is 1.38.

EXAMPLE VI

Example IV was repeated except that a catalyst was prepared shortly before use in the following polymerization by reacting diethyl aluminum chloride in heptane with water in 1,4-dioxane in toluene at $-10°C$ initially and then warming to room temperature. The titer of the diethyl aluminum chloride in heptane is 0.0355 grams/cc. solution; the titer of water in 1,4-dioxane is 0.0294 grams/cc. solution; and 80 cc. toluene was present in the reaction bottle. The mole ratio of the diethyl aluminum chloride/water aluminum 10/1. The polymerzation was carried out at $-20°C$ at a methyl vinyl ether/cc. toluene ratio of 1/1 and using 0.5 mole-% of the above prepared catalyst, the moles of catalyst being calculated on the basis of the moles of ethyl aluminum dichloride used in the preparation and relative to methyl vinyl ether. Reaction overnight gave a 97.5 percent yield of a product having a viscosity number of 2.1 at 0.1 percent in benzene at 25°C. The product is a form-stable coherent film former with rubbery character of moderate strength. X-ray diffraction shows the film to be amorphous.

EXAMPLE VII

The criticality of employing a co-catalytic amount of water is shown in the following experiment:

A clean 5-liter reaction vessel was heated with a hot air blower while under vacuum and then purged twice with dry nitrogen. Through a dropping funnel (closed circuit to the reactor) 1,200 g. of dry heptane prepared by distilling from sodium dispersion were introduced. The heptane was charged to the reactor so as not to contact air or moisture. Next, 300 g. of isobutyl vinyl ether distilled from sodium dispersion and stored over sodium ribbon were introduced from a dropping funnel through a closed circuit to the reactor. The reactor contents were kept initially at about 18°–21°C by circulating water around the outside of the 5 liter flask. Next, 0.1 weight percent diethyl aluminum chloride (based on the weight of the monomer) was added from a syringe through a port equipped with a self sealing rubber septum so as to exclude air and moisture. 130 minutes later an additional 0.1 weight percent of diethyl aluminum chloride was added. The reaction was allowed to continue for an additional 65 minutes. During the entire reaction, the temperature ranged from 18°–21°C. A 275 ml. sample was then removed from the reactor and the reaction of the sample was then removed from the reactor and the reaction of the sample stopped by addition of 5 cc. of methanol. Conversion of the monomer to polymer was about 51.4 percent and the polymer had a viscosity number of 2.2

To the remainder of the reactants in the 5 liter flask, 0.03 cc. of water was added. After 10 minutes the temperature rose to 27°C and the contents of the flask became very viscous. The reaction was allowed to continue for about 110 minutes at which time it was stopped by the addition of 5 cc. of methanol. Conversion of the monomer to homopolymer was about 99.7 percent. The homopolymer product exhibited a viscosity number of 3.0 at 0.1 percent in toluene. Thus, the simultaneous rise in temperature along with the increase in viscosity of the reactions coupled with the improvement in conversion and higher viscosity of the products, demonstrates the uniqueness and superiority of the instant invention.

EXAMPLE VIII

A clean, dry polymerization vessel was heated with a Bunsen flame under vacuum to remove the last traces of surface moisture. Nitrogen gas pre-purified by passing through a triethyl aluminum-heptane solution and dry ice traps was then passed into the vessel. Eighty grams of purified heptane and 20 g. of purified isobutyl vinyl ether were distilled into the flask under nitrogen from LiAlH$_4$. The polymerization solution was then transferred to a dry box and measured amounts of wet heptane and 0.1 weight percent (based on the weight of the monomer) of diethyl aluminum chloride were injected. After three hours the polymerization was quenched with 10 cc. methanol, diluted with heptane, water washed and stabilized with a phenolic antioxidant. The heptane was stripped off under reduced pressure and the polymer was dried at 50°–60°C under 5 mm. pressure for 7 hours. The results of a series of runs with varying water content is listed in the following table:

TABLE II

| Catalyst/H$_2$O Ratio | PPM Water in Heptane | % yield | Viscosity No. 0.1% Toluene, 25°C |
|---|---|---|---|
| 4/1 | 8.2 | 74.2% | 4.41 |
| 15/1 | 2.3 | 92.5% | 3.60 |
| no added water | less than 2ppm | 1.9% | 0.90 |

EXAMPLE IX

A reaction was carried out as in Example VII, with isobutyl vinyl ether but at a diethyl aluminum chloride/H$_2$O mole ratio of 8/1. The viscosity number (0.1 percent, toluene) of the product was 6.2.

Various modifications and variations of this invention will be obvious to a worker skilled in the art and it is understood that such modifications and variations are to be included within the purview of this application and the spirit and scope of the appended claims.

I claim:

1. A process for the production of homopolymers of alkyl vinyl ethers comprising polymerizing an alkyl vinyl ether monomer, wherein the alkyl radical contains from 1 to 20 carbon atoms by maintaining the monomer in contact at a temperature of from about −30°C. to 60°C. with about 0.2 to about 2.0 mole %, based on the weight of said monomer, of a catalyst consisting of the reaction product of a di-alkyl aluminum halide of the formula:

wherein, R and R$_1$ represents an alkyl radical of from 1 to 20 carbon atoms and x represents a halogen radical, and a co-catalytic amount of water ranging from about 1 to 30 moles per mole of said dialkyl aluminum halide.

2. A process as defined in claim 1, wherein the alkyl vinyl ether monomer is methyl vinyl ether.

3. A process as defined in claim 1, wherein the dialkyl aluminum halide is diethyl aluminum chloride.

4. A process as defined in claim 3, wherein the alkyl vinyl ether monomer is methyl vinyl ether.

5. A process as defined in claim 4, wherein the temperature ranges from about −30°C to +10°C.

6. A process as defined in claim 1, wherein the alkyl vinyl ether monomer contains an alkyl radical of from two to 20 carbon atoms.

7. A process as defined in claim 6, wherein the temperature ranges from about −10°C to 60°C.

8. A process as defined in claim 7, wherein the alkyl vinyl ether is isobutyl vinyl ether and the dialkyl aluminum halide catalyst is diethyl aluminum chloride.

9. A process as defined in claim 1, wherein the dialkyl aluminum chloride concentration is about 0.03 to about 0.5 mole-% based on the weight of the monomer.

10. A process as defined in claim 9, wherein the molar ratio of dialkyl aluminum halide catalyst to water ranges from about 3/1 to 15/1.

11. A process as defined in claim 1, wherein an organic hydrocarbon is employed as a solvent carrier for the alkyl vinyl ether monomer.

* * * * *